United States Patent
Mumford et al.

(10) Patent No.: US 8,064,579 B2
(45) Date of Patent: Nov. 22, 2011

(54) PREPAID SERVICES ACCOUNTS WITH MULTI-USER CUSTOMERS AND INDIVIDUALIZED QUOTAS

(75) Inventors: Gregory L. Mumford, Marion, IA (US); Jon E. Abel, Cedar Rapids, IA (US); David A. Fitzgerald, Springville, IA (US); Radhika Gunasekar, Cedar Rapids, IA (US); Anna Marie Appleby, Cedar Rapids, IA (US); John M. Leslein, Marion, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1090 days.

(21) Appl. No.: 11/862,731

(22) Filed: Sep. 27, 2007

(65) Prior Publication Data

US 2009/0088128 A1 Apr. 2, 2009

(51) Int. Cl.
*H04M 15/10* (2006.01)
(52) U.S. Cl. ........... 379/111; 379/114.18; 379/114.2; 379/115.02; 379/127.05; 379/144.01; 455/405; 705/35; 705/41; 705/44; 705/63; 705/301
(58) Field of Classification Search .......... 379/111, 379/127.05, 144.01, 114.18, 114.2, 115.02; 455/405, 408; 705/1, 27, 32, 35, 44, 63, 705/41, 301

See application file for complete search history.

(56) References Cited

U.S. PATENT DOCUMENTS

| | | | | |
|---|---|---|---|---|
| 5,469,497 A * | 11/1995 | Pierce et al. | ............ | 379/114.17 |
| 5,673,309 A * | 9/1997 | Woynoski et al. | ....... | 379/114.18 |
| 5,719,926 A * | 2/1998 | Hill | ............ | 379/115.02 |
| 5,825,863 A * | 10/1998 | Walker | ............ | 379/114.2 |
| 5,991,748 A * | 11/1999 | Taskett | ............ | 705/41 |
| 6,473,500 B1 * | 10/2002 | Risafi et al. | ............ | 379/144.01 |
| 6,952,575 B1 * | 10/2005 | Countryman et al. | ........ | 455/408 |
| 7,184,530 B2 | 2/2007 | Warrier et al. | | |
| 7,627,529 B1 * | 12/2009 | Bauer et al. | ............ | 705/44 |
| 2002/0103762 A1 * | 8/2002 | Lopez et al. | ............ | 705/63 |
| 2003/0086548 A1 * | 5/2003 | Nelson | ............ | 379/144.01 |
| 2004/0077332 A1 | 4/2004 | Ephraim et al. | | |
| 2004/0106393 A1 | 6/2004 | Chowdhury et al. | | |
| 2005/0027624 A1 * | 2/2005 | Cai | ............ | 705/32 |
| 2005/0114230 A1 * | 5/2005 | Fang | ............ | 705/27 |
| 2006/0003736 A1 | 1/2006 | Chan et al. | | |
| 2006/0073808 A1 | 4/2006 | Buchert | | |
| 2007/0106569 A1 | 5/2007 | McQuaide, Jr. et al. | | |
| 2007/0112655 A1 * | 5/2007 | Jones | ............ | 705/35 |
| 2008/0077426 A1 * | 3/2008 | Li et al. | ............ | 705/1 |
| 2009/0060154 A1 * | 3/2009 | Cai | ............ | 379/127.05 |
| 2009/0088128 A1 * | 4/2009 | Mumford et al. | ............ | 455/405 |

FOREIGN PATENT DOCUMENTS

WO 98/56160 12/1998

OTHER PUBLICATIONS

International Search Report dated Dec. 8, 2008 (1 page).

* cited by examiner

*Primary Examiner* — Gerald Gauthier

(57) ABSTRACT

Prepaid services include a multi-user prepaid services account as well as a prepaid balance associated with the account. A plurality of user records associated with the account each includes a quota. A service monitoring component may be configured to repeatedly draw down the prepaid balance by providing one or more allocations of the prepaid balance during a service period to a user associated with a respective user record.

27 Claims, 3 Drawing Sheets

PREPAID SERVICES ACCOUNTS WITH MULTI-USER CUSTOMERS AND INDIVIDUALIZED QUOTAS

BACKGROUND

Service providers may have the option to extend credit to customers for provided services with the expectation of payment at the termination of a service period. Alternatively, a service provider may require a customer to pay for services before they are provided. So-called prepaid services may allow a customer to purchase services prior to their provision and usage. Accordingly, a prepaid customer may maintain a positive monetary balance in a prepaid account held with the service provider. Alternatively, the customer may purchase units of service from the service provider for use over a period of time. In the example of a telephone network, a prepaid customer may purchase telephone services in units such as minutes.

The telephone network operator may establish a prepaid account for tracking the usage of any purchased minutes. In certain contexts, e.g., business customers and family calling plans, among others, it may be desirable to maintain a prepaid account that allowing multiple users to draw down a single account balance.

DETAILED DESCRIPTION OF THE PREFERRED EMBODIMENT

Figure 1:
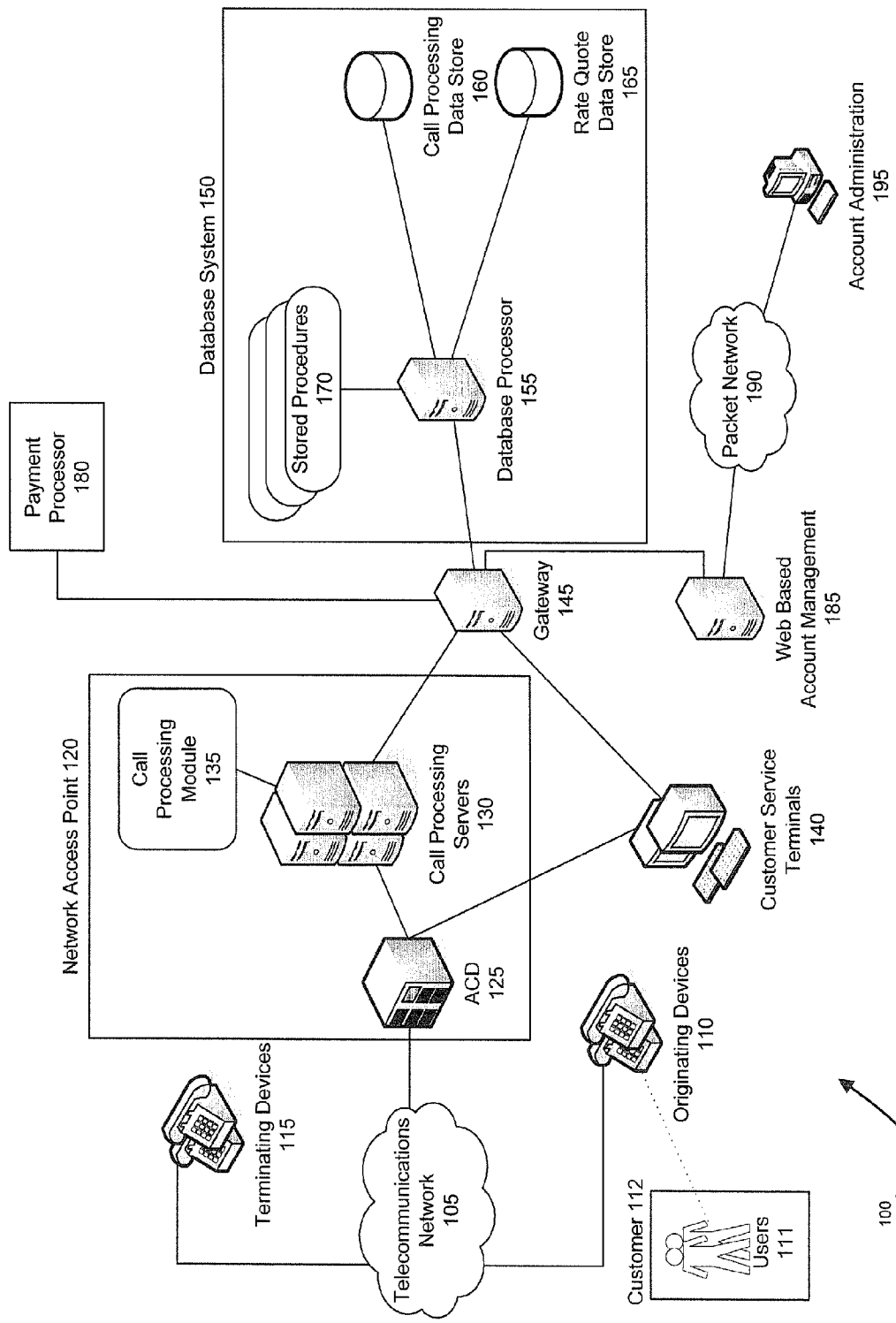
FIG. 1 illustrates an exemplary prepaid service system for providing prepaid telecommunication services.

FIG. 1 illustrates one possible exemplary prepaid service system 100 for providing prepaid telecommunication services. Originating devices 110 connect to a network access point 120 and to terminating devices 115 through a telecommunications network 105. The network access point 120 may maintain a connection to telecommunications network 105 and may include system 100 elements such as an automated call distributor (ACD) 125 as well as a plurality of call processing servers 130. In addition to connecting to the call processing servers 130, the automated call distributor may connect to one or more customer service terminals 140. A call processing module 135 may be located on the call processing servers 130 and may include computer instructions configured to provide prepaid telecommunication services to a customer 112. A gateway server 145 may serve as an intermediary between the call processing servers 130, the customer service terminals 140, and a prepaid database system 150. The prepaid database system 150 may include a database processor 155 configured to execute a plurality of stored procedures 170. The processor 155 additionally has access to a call processing data store 160 and a rate quote data store 165.

Telecommunications network 105 may be a circuit switched network generally referred to as a public switch telephone network (PSTN). Alternatively, telecommunications network 105 may be a combination of circuit switching and packet switching network elements cooperatively connected to enable signaling system seven (SS7) based telephone calls. Other networks such as cellular networks for wireless calls and Voice Over Internet Protocol (VOIP) networks for packet switched network based voice calls may also be integrated with telecommunications network 105. Accordingly, it is to be understood that network 105 includes switches, links, gateways, etc. as necessary to facilitate the transmission of calls and data between devices 110 and 115.

While depicted as a conventional telephone, originating devices 110 may be any type of telecommunications devices capable of connecting to telecommunication network 105 and communicating via one or more protocols associated therewith. Accordingly, originating devices 110 may be capable of accepting input from users 111 such as an access number for the telecommunications network access point, a prepaid user identifier 230 (FIG. 2b), and a telephone number associated with the terminating device 115. Similarly to originating devices 110, terminating devices 115 may be any type of telecommunications device capable of connecting to telecommunications network 105 and receiving an incoming call therefrom. It is to be understood that there may be many originating and terminating devices 110, 115 connecting to the prepaid services system 100 at any given time.

It is to be understood that FIG. 1 and this description thereof illustrates prepaid service in the example of prepaid telecommunications services. However, the method 300, described below, may in whole or part be applicable to other forms of prepaid services. Even in the example of prepaid telecommunications services, there may be multiple entities responsible for providing the elements of system 100. For instance, a telecommunications network provider may provide some of the components while a prepaid service provider may provide others. Additionally, terminating devices 115 may not exist at all. For instance, originating devices 110 may receive a prepaid service that does not include terminating devices 115.

Network access point 120 provides a connection to telecommunications network 105 for the prepaid service provider. Network access point 120 may host telecommunications equipment for implementing a so-called intelligent network or intelligent services network. The intelligent network generally enables a telecommunications provider to offer value-added services, such as prepaid calling, to traditional telecommunication systems. Among other equipment, intelligent networks may include automated call distributor 125 and call processing servers 130. Network access point 120 may further provide local or wide area network connections for connecting prepaid services system 100 devices, e.g., automated call distributor 125, call processing servers 130, etc. While FIG. 1 only depicts a single telecommunications network access point, it is to be understood that prepaid services system 100 may have multiple such network access points 120, which may be geographically dispersed.

Automated call distributor 125 maintains a connection to telecommunications network 105 in order to receive incoming connections from originating devices 110 and establish connections with terminating devices 115. Automated call distributor 125 may include a telecommunications switching device such as a private branch exchange (PBX). Additionally, automated call distributor may include a processing device configured to execute call routing rules that direct an incoming call to other devices, e.g., call processing servers 130, customer service terminals 140, etc. Automated call distributor 125 may further queue incoming calls should there ever be insufficient resources available to immediately handle the calls. While FIG. 1 merely illustrates a single automated call distributor 125, other exemplary approaches may include multiple automatic call distributors 125.

Call processing servers 130 receive calls routed from automated call distributor 125 and may provide interactive functionality to users 111. Call processing servers 130 may be automated response units, or voice response units. Such units may provide users 111 with an audible menu of options. Users 111 may select an option by entering a number on the key pad of their device 110 corresponding to a particular menu option. Call processing servers 130 may be further configured to receive options through voice recognition software such that users 111 may speak the menu option corresponding with their selection. Call processing servers 130 may receive multiple inputs from users 111 in addition to any menu selections. These inputs may include a prepaid services account identifier 205, a security pin, and a phone number of a terminating device 115.

Figure 2:
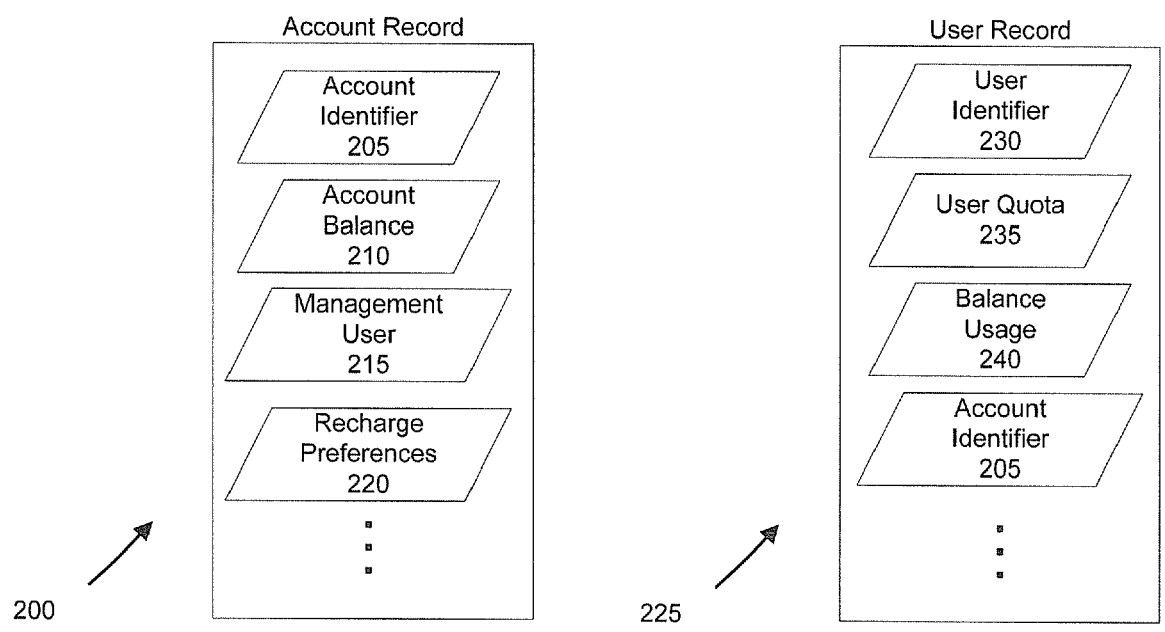
FIG. 2a illustrates an exemplary database table definition relating to a prepaid services account record.
FIG. 2b illustrates an exemplary database table definition relating to a user record.

Call processing servers 130 may control automated call distributor 125 through signaling communication in order to establish a connection through telecommunications network 105 to terminating device 115. Similarly, call processing servers 130 may provide signaling instructions to automated call distributor 125 in order to end, or tear down, the connections between originating devices 110 and terminating devices 115. Call processing servers 130 may periodically monitor the connections between originating devices 110 and terminating devices 115 in order to track the duration of time in which the connection is maintained, and may further conference into the connection in order to provide automated messages to users 111, e.g., messages indicating an impending depletion of an account balance 210 (FIG. 2a). In this regard, call processing servers 130 may act as a service monitoring component.

Additionally, call processing servers 130 may include a computer readable medium encoded with computer executable instructions configured to effectuate account tracking and call processing features of the prepaid services system 100. Such computer instructions may be included in a call processing module 135. Call processing module 135 may conceptually divide a call spanning a service period into one or more lengths of time such that each length of time may represent a service increment. Service increments may be a standard increment or a custom increment. The length of time associated with a standard increment is generally equal to all other standard increments associated with a call. However, the length of time associated with a custom increment may vary from that of other custom increments as well as from that of standard increments. The length of time associated with a standard increment may be established on a system-wide, account-by-account, or product-by-product basis. Dividing the service period into one or more service increments may allow system 100 to determine whether the account balance 210 (FIG. 2a) is sufficient prior to providing service for an additional service increment. Additionally, call processing module 135 may be configured to provide service to a user 111 for a custom increment rather than a standard increment if account balance 210 is insufficient to provide service for the length of time associated with a standard increment. As will be discussed below, account balance 210 does not necessarily store a monetary value. Rather, account balance 210 may store a unit of service balance. A more detailed description of the exemplary operations that may be provided by call processing module 135 is provided below.

A gateway 145 may act as an intermediary between telecommunications network access point 120, customer service terminals 140, and prepaid database system 150. Gateway 145 may include network connections to database system 150, call processing servers 130, and customer service terminals 140. In one exemplary approach, the network connections to gateway 145 may be established on a private local area network or wide area network that can more closely guarantee the quality of service in order to minimize latency and thereby provide real-time or near real-time access and updates to data held in data stores 160 and 165. Gateway 145 may receive all requests for access to prepaid database system 150 in order to provide a barrier to direct access to database system 150. Limiting access to database system 150 may be appropriate in some circumstances. For instance, exemplary approaches may provide, queuing, improved security, access to legacy systems, etc. It is to be understood that some database processors 155 may be capable of handling a large number of requests from the call processing servers 130 and customer service terminals 140 and therefore may eliminate the need for gateway 145.

Gateway 145 may be a web application server, although any computing device having a computer readable medium including instructions for communicating with database system 150 would suffice. Gateway 145 may be a networked computer system configured with server software for accepting connections from the call processing servers 130 and customer service terminals 140. Call processing servers 130, for instance, use these connections to execute remote procedure calls on gateway 145. The remote procedure calls executed on gateway 145 communicate with database processor 150 to retrieve and set data on database system 150 through the stored procedures 170 (discussed below). While FIG. 1 merely depicts a single gateway 145, it is to be understood that gateway 145 may include a pool of gateways 145 configured to share the responsibility of interacting with database system 150.

Payment processor 180 may receive payment requests from gateway 145 and further may provide acknowledgement that a payment request was accepted. Such a payment processor 180 may be external to system 100 and may be entirely external to the telecommunications service provider that offers system 100. Payment processor 180 accepts payment account information as well as a payment amount and determines whether the provided account can accept the payment amount. The payment account may be a credit card account, and payment processor 180 may be a credit card processor.

Database system 150 may be a relational database management system. Many such systems, including SQL Server, Oracle, and MySQL, among others, are generally available. Call processing data store 160 may store call processing data in row and column table format, and may include multiple tables. A row, or record, includes one or more columns, or fields, holding data values for specifically defined fields. Rows may be uniquely identified by the values of one or more columns. Indexes of one or more columns can be included to aide in searching for particular rows of the table. Other database systems, e.g., embedded databases, hierarchical systems, file based storage, etc., could be used as database system 150. Database processor 155 includes instructions on a computer readable medium that facilitate database transactions. Such instructions may be provided by one or more stored procedures 170. Additionally, processor 155 may include instructions for the bulk or mass loading of data, e.g. card activations from retail purchases. Similarly, bulk exporting of data may be needed to support accounting and revenue reporting features.

FIG. 1 depicts rate quote data store 165 as being part of database system 150. However, rate quote data store 165 may have uses outside of the context of system 100. Accordingly, it is to be understood that rate quote data store 165 may be external to system 100, such that gateway 145 may access data thereon. In an exemplary approach that excludes gateway 145, rate quote data store 165 may be accessible by call processing servers 130.

Incoming calls to automated call distributor 125 may be routed to customer service terminals 140 in order to provide personalized customer service to users 111. Customer service terminals 140 may include a computing device and a display. A graphical user interface (GUI), or the like, provided by the terminals 140 may enable customer service personnel to access the prepaid database system 150 through the gateway 145. Accordingly, the customer service terminals 140 may provide access to stored procedures 170 of database system 150. As discussed above, stored procedures 170 manipulate the data associated with an account record 200 (FIG. 2a).

Packet network 190 is generally a packet switched communication network e.g., an Internet Protocol (IP) network that is a wide-area network (WAN) such as the Internet. Packet network 190 may interconnect various computing devices and the like, such as server 185 and administration client 195, etc. Interconnections with network 190 may be made by various media including wires, radio frequency transmissions, and optical cables. Other devices connecting to packet network 190, e.g. switches, routers, etc., are omitted for simplicity of illustration in FIG. 1.

A web based account management server 185 may provide access to account and call records 200, 225 for manipulation by a management user of customer 112. Web based account management server 185 may access database system 150 through intermediary gateway 145. Further web based account management server 185 may be a World Wide Web (WWW) server or a web application server, although any computing device having a computer readable medium including instructions for communicating with gateway 145 and administration client 195 may suffice. In one exemplary approach, server 185 includes a computer readable medium including instructions for presenting an interactive management interface, e.g., a graphical user interface (GUI) provided in a web page or the like.

FIG. 2a illustrates an exemplary account record 200 for use with system 100. Account record 200 may be stored in call processing data store 160 of database system 150. An account identifier field 205 provides a unique identifier to differentiate accounts from one another. An account balance field 210 specifies the balance available to customer 112 to draw upon when receiving prepaid services. The value stored in account balance field 210 may be a monetary value. However, in other exemplary approaches the value may be the number of units of service that were purchased, e.g., minutes. A management user field 215 may identify a particular user 111 that has been designated an account manager for all users 111 of customer 112. Recharge preferences 220 may include payment account information and a minimum level of the account balance 210 that would trigger a recharge. Recharge preferences 220 may further indicate that a recharge is not permitted. A rate associated with the card may further be stored in the account record 200 or may be provided by rate quote data store 165.

FIG. 2b illustrates an exemplary database table definition relating to a user record 225. User record 225 may be stored in call processing data store 160 of database system 150. A user identifier field 230 provides a unique identifier to differentiate users from one another. A user quota field 235 may provide an upper limit of the account balance 210 that may be utilized by each user 111. User quota 235 may be individualized such that each user 111 has a differing amount of the account balance 210 at their disposal. A balance usage field 240 may store an amount of the account balance 210 that has been used by user 111. Balance usage 240 may be configured to reset periodically, such as on a monthly basis. User record 225 further includes account identifier 205 in order to provide an associative link back to a particular account record 200 that shares the same account identifier 205. Customer 112 may have a plurality of user records 225 associated with an account record 200 by including account identifier 205 in each of the plurality of user records 225.

The management interface provided by web based account management server 185 may allow a management user to associate user records 225 with account record 200. The management interface may further allow the management user to set user quotas 235. User quota 235 may be set as a fixed amount. In one exemplary approach, the user quota 235 may be limited by the account balance 210. However, in other exemplary approaches, the user quota 235 may encompass the entirety of account balance 210 or may even exceed the account balance 210. Still further, the management interface may allow user quota 235 to be set as a percentage of the account balance 210.

Stored procedures 170 (FIG. 1) may include computer executable instructions stored in database system 150 and may provide access to data stored in data stores 160 and 165. Stored procedures 170 may include a balance inquire procedure that accepts an account identifier 205 as a parameter and provides the account balance 210 associated therewith. A deduction procedure may deduct a provided amount from the account balance 210. A balance adjustment routine may allow the account balance 210 to be restored or adjusted to a larger amount to correct any excessive draw downs.

Prepaid telecommunication accounts represented by exemplary account record 200 may include a physical representation in the form of a plastic card, i.e., a calling card. A calling card representing an account with an account balance 210 stored in database system 150 may be referred to as a remote memory card. Accordingly, the balance 210 is not stored or encoded on the card. The card merely includes the account identifier 205 which enables system 100 to determine the account balance 210 from call processing data store 160. However a physical card is not required and often is not provided due to the ability to purchase prepaid telecommunication services over the Internet from World Wide Web based retailers.

Prior to an account being available for use by customer 112, the account must be created. Creation of an account may include the assignment of a unique account identifier 205 and an initial balance 210. The account identifiers 205 may be created and loaded into call processing data store 160 in batches. After creation, the account identifiers 205 may be provided to retail businesses for sale. After purchase by customer 112, the retailer may notify system 100 that the account should be activated for access and use by customer 112. However, it is to be understood that retailers are not the only source of prepaid accounts. The prepaid service provider may provide accounts directly to customer 112.

Computing devices such as call processing servers 130, gateway 145, and database processor 155 may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as call processing servers 130, gateway 145, and database processor 155, etc., may each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Database system 150 may be a relational database management system (RDBMS). An RDBMS may employ Structured Query Language (SQL) in addition to a language for creating, storing, editing, and executing stored procedures, such as the PL/SQL language mentioned above. However, it is to be understood that database system 150 may be some other kind of database such as a hierarchical database, a set of files, an application database in a proprietary format, etc. Database system 150 may include a computing device, i.e., processor 155, employing a computer operating system such as one of those mentioned above, and is accessed via a network in any one or more of a variety of manners, as is well known. Exemplary systems are possible in which at least some of data stores 160 and 165 are both combined as a single data store, or are provided on completely independent databases.

Figure 3:
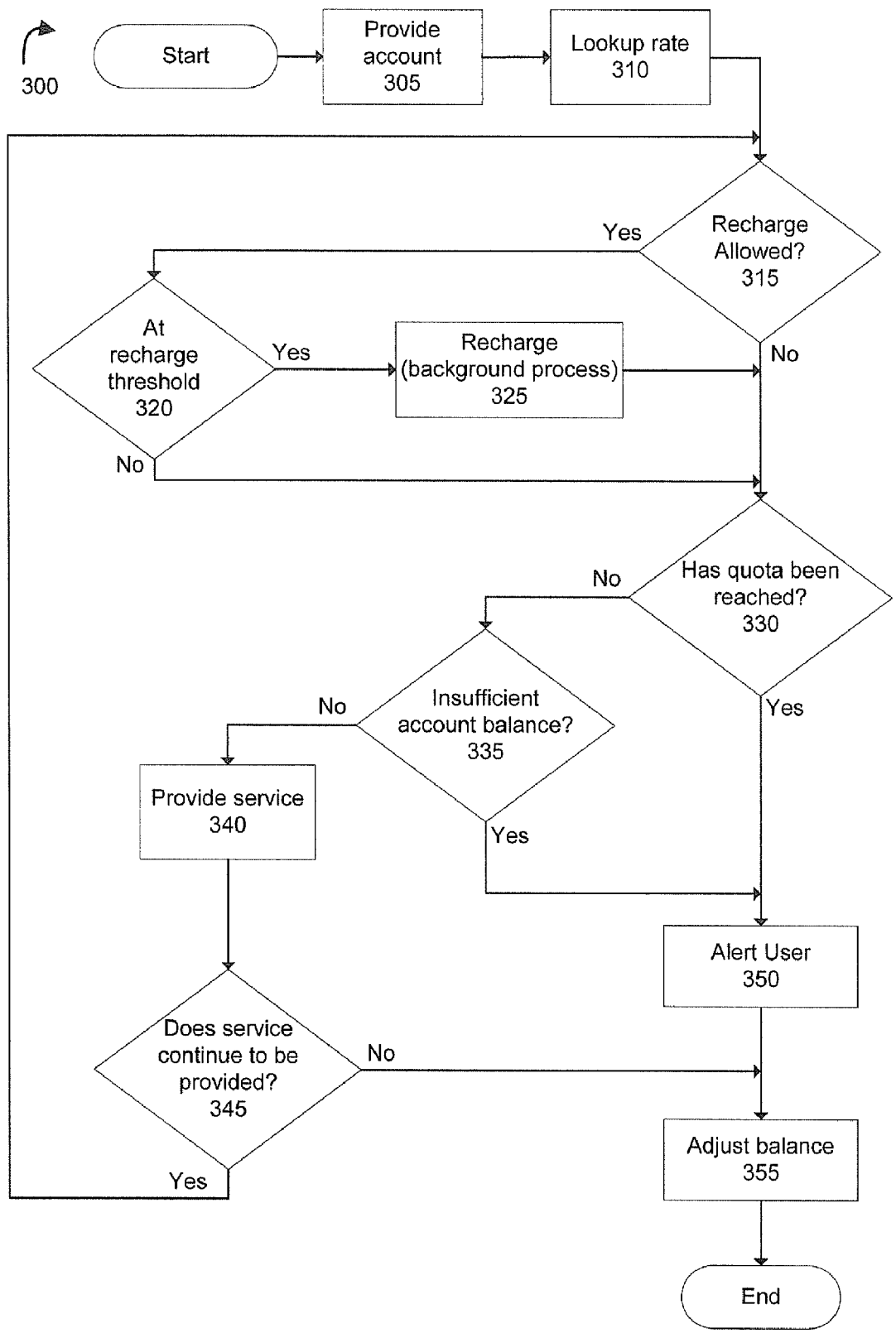
FIG. 3 illustrates a flowchart depicting exemplary steps and decisions relating to a method for providing prepaid services to a user.

FIG. 3 illustrates a flow chart of an exemplary process 300 for providing prepaid services to a user 111 of customer 112 of a prepaid services system 100. While this process is directed to the provision of prepaid telecommunications services, it is to be understood that these steps are equally applicable to other forms of prepaid services. Call processing servers 130 may include a computer-readable medium having stored instructions for carrying out certain operations described herein, including some or all of the operations described with respect to process 300. For example, some or all of such instructions may be included in call processing module 135.

The process 300 begins in step 305 in which user 111 accesses a prepaid account. In one exemplary approach, user 111 will use originating device 110 to call an access number associated with telecommunications network access point 120. Automated call distributor 125 receives the call and thereby establishes a connection to originating device 110 over telecommunications network 105. Automated call distributor 125 routes the call to call processing servers 130. User 111 may be presented with audible instructions for entering a user identifier 230, a security pin, and a telephone number for a terminating device 115.

Next, in step 310, call processing module 135 may query the rate quote data store 165 of the database system 150 to retrieve the costs associated with establishing a connection to terminating device 115. A particular service may include a rate as well as other costs and fees. Some service providers may charge a fixed fee for each connection to terminating device 115. Taxes may be assessed on a per-unit of service basis. Additionally, there may be fees associated with certain types of pay-per-use phones, i.e. payphones. Accordingly, any costs and fees associated with providing service may be retrieved from the rate quote data store 165. The costs and fees may be stored in the rate quote data store 165 as a cost per-unit-of-time value, e.g. cost/second. However, as explained above service may be provided during a service period in one or more service increments. Therefore, an allocation that will be deducted from the account balance 210 at each service increment may be determined by the costs and fees retrieved from the rate quote data store 165 in association with the length of time of the service increment.

Next, in step 315, recharge preferences 220 may be queried to determine whether a recharge is allowed. Recharge preferences 220 may indicate an amount that may be recharged. If an amount may not be recharged to the account balance 210, then the process may proceed to step 330. If the recharge preferences 220 indicate that an amount may be recharged to account balance 210, then the process proceeds to step 320.

Following a determination in step 315 that a recharge is allowed, it is determined in step 320 whether account balance 210 is at a minimum level defining a recharge threshold. As discussed above, the minimum balance level may be set by a management user using the web based account management server 185. The recharge threshold may be fixed level based only on the balance 210 amount or may be a variable level based on the balance 210 amount with respect to the service rate retrieved in step 310. Initiating a recharge when balance 210 reaches a minimum level rather than waiting until the balance 210 becomes depleted may allow the recharge step 325 to proceed as a background or concurrent process to the other steps of process 300.

Following a determination in step 320 that a recharge is required, call processing module 135 may automatically recharge the account balance 210 in step 325. Call processing server 130 may send a recharge request including the payment account information included with recharge preferences 220 along with a recharge amount to gateway 145. Gateway 145 may then send the payment account information and recharge amount to payment processor 180. Gateway 145 may receive a response indicating whether payment processor 180 accepted the payment account information and recharge request. Upon receiving an acknowledgement that the recharge was accepted, gateway 145 may call a stored procedure 170 in order to update account balance 210 with the amount of the recharge.

Next, in step 330, it is determined whether user 111 has reached the assigned user quota 235. Customer record 225 may be queried to retrieve user quota 235 and balance usage 240. The determination of step 330 may be based on a comparison that finds balance usage 240 to be greater than or equal to user quota 235. However, a stricter treatment of user quota 235 may required that balance usage 240 remains at or below user quota 235. As discussed above, service is provided to user 111 over a service period in one or more service increments. Therefore, it may further be determined that the provision of service for a service increment would exceed the user quota 235. An allocation related to the provision of service for a service increment may be calculated based on the rate determined in step 310 and the length of time of the service increment. Accordingly, if the sum of this calculated allocation and the balance usage 240 exceed user quota 235, the process may proceed to step 350. Alternatively, if user quota 235 has not been reached and will not be reached, then the process may proceed to step 335.

Next, in step 335, it is determined whether the accessed account has a sufficient balance 210. Accordingly, the balance 210 will generally need to be greater than the allocation associated with the provision of service for a service increment. However, as discussed above, even if the account balance 210 is insufficient to provide service for a standard increment, it may be sufficient to provide service for a custom increment. Accordingly, the length of time of a custom increment may be based on the account balance 210 with respect to the service rate determined in step 310. Providing service for a custom increment may allow account balance 210 to become fully depleted and therefore would only be insufficient at such a point. If the balance is not sufficient, the process may proceed to step 350. If the balance 210 is sufficient, the process proceeds to step 340.

Next, in step 340, service is provided to user 111 for up to a length of time corresponding to the length of the service increment. The account balance 210 may be drawn down by the allocation associated with the provision of service for a service increment that was calculated above in step 310. Additionally, this allocation may be added to the balance usage 240. Accordingly, balance usage 240 may represent a sum of the allocations provided to user 111. Additionally, the balance usage 240 may be limited by the user quota 235. For a newly connected user 111, call processing server 130 may cause automated call distributor 125 to establish a telecommunications connection between originating device 10 and terminating device 115. Call processing server 130 may further record transaction details including the number of the originating device, the number of the terminating device, the account identifier 205, the rate, and the time that service was initiated. For a previously established connection between originating device 110 and terminating device 115, the connection may simply be maintained. Call processing server 130 may also track a sum of the lengths of time of the service increments. As discussed above, system 100 may be divided among multiple cooperating entities. For instance, a telecommunications service provider may be responsible for providing service by establishing and maintaining the connections between originating devices 110 and terminating devices 115. The prepaid service provider may be external to the telecommunications service provider and may merely monitor the service provided to user 111 in order to track and maintain account balance 210.

Next, in step 345, the method determines whether service continues to be provided. Call processing server 130, acting as a service monitoring component, continuously monitors the connection between originating device 110 and terminating device 115. If service continues to be provided, the method returns to step 315. By returning to step 315, the process may repeatedly draw down the account balance 210 according to step 340. If service is no longer being provided, the process proceeds to step 355.

Following a determination in step 330 that a user's quota 235 has been reached or a determination in step 335 that account balance 210 is insufficient, the user 111 may receive an alert in step 350. The alert will respectively indicate that the user's quota 235 has been reached or that the account balance 210 is insufficient based on whether step 350 is reached from step 330 or 335. Call processing server 130 may provide an automated message to the parties that the connection is about to be ended. Call processing server 130 may further instructs automated call distributor 125 to end the connection between originating device 110 and terminating device 115.

Next, in step 355, any unused portion of an allocation may be returned to account balance 210. Call processing server 130 may complete any database records regarding the call such as storing the ending time. Because allocations of the account balance 210 are made for one or more service increments in step 340, there is a possibility that the account will be over billed due to the service ending before the end of the latest service increment. Moreover, the total call length, or service period, may be determined to be less that the sum of the lengths of time associated with the service increments. As discussed above, transaction details may include a start and end time of the call such that a call length, i.e. the service period, can be determined. Call processing server 130 may also track a sum of the lengths of time associated with any service increments. When the service period is less than the sum of the lengths of the service increments, the balance 210 may be adjusted to reflect the actual length of the call. Any portion of an allocation that is return to account balance 210 may also be deducted from balance usage 240.

Following step 355, the process ends.

Accordingly, system 100 and process 300 enable originating devices 110 to connect to terminating devices 115 with the connection fees and costs being billed to a prepaid account. Specifically, the prepaid account may include a prepaid account balance 210 shared by a plurality of users 111 associated with customer 112. A call processing module 135 may be configured to first check whether a balance usage 240 of user 111 has reached a quota 235 set for user 111 in user record 225. If the quota 235 has not been reached, then the service may be provided so long as there is a sufficient account balance 210 to provide the telecommunication service for a service increment.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A system, comprising:
   a multi-user account;
   a balance associated with the account;
   a plurality of user records associated with the account, where each user record includes a quota;
   a service monitoring component to repeatedly draw down the balance by providing one or more allocations of the balance during a service period to a user associated with a respective user record; and
   an account balance recharge component to recharge the balance to a predetermined level, and
   where the service-monitoring component is further to accept a recharge preference that defines a minimum level of the balance that will trigger the balance recharge component to recharge the account balance.

2. The system of claim 1, where the one or more allocations are determined according to at least a service rate and a length of time.

3. The system of claim 1, where the service monitoring component is further to limit the allocations that are provided to the user based on the quota of the user record.

4. The system of claim 3, where a sum of the allocations that are provided to the user is less than or equal to the quota.

5. The system of claim 1, where the quota included in at least one user record of the plurality of user records encompasses an entirety of the balance.

6. The system of claim 1, where the quota is based on a percentage of the balance.

7. The system of claim 1, where the quota is based on a fixed amount of the balance.

8. The system of claim 1, further comprising a management interface to provide access to the account and the plurality of user records.

9. The system of claim 8, where the management interface is further to allow a management user to set the quota associated with each user record.

10. A method, implemented by at least one non-transitory device, the method comprising:
    providing a multi-user account;
    associating a balance with the account;
    associating a plurality of user records with the account, where each user record includes a quota;
    repeatedly drawing down the balance by providing one or more allocations of the balance during a service period to a user associated with a respective user record;
    recharging the account balance to a predetermined level; and
    accepting a recharge preference that defines a minimum level of the account balance that will trigger the recharging.

11. The method of claim 10, further comprising calculating the allocations according to at least a service rate and a length of time.

12. The method of claim 10, further comprising limiting the allocations that are provided to the user based on the quota of the user record.

13. The method of claim 12, further comprising limiting a sum of the allocations that are provided to the user to an amount that is less than or equal to the quota.

14. The method of claim 10, further comprising setting the quota of at least one user record of the plurality of user records to an entire amount of the balance.

15. The method of claim 10, further comprising basing the quota on a percentage of the balance.

16. The method of claim 10, further comprising basing the quota on a fixed amount of the balance.

17. The method of claim 10, further comprising providing a management interface to provide access to the account and the plurality of user records.

18. The method of claim 10, further comprising allowing a management user to set the quota associated with each user record.

19. A non-transitory memory device comprising:
    one or more instructions to provide a multi-user account;
    one or more instructions to associate a balance with the account;
    one or more instructions to associate a plurality of user records with the account, where each user record includes a quota;
    one or more instructions to repeatedly draw down the balance by providing one or more allocations of the balance during a service period to a user associated with a respective user record;
    one or more instructions to recharge the account balance to a predetermined level; and
    one or more instructions to accept a recharge preference that defines a minimum level of the account balance that will trigger the recharging.

20. The non-transitory memory device of claim 19, further comprising one or more instructions to calculate the allocations according to at least a service rate and a length of time.

21. The non-transitory memory device of claim 19, further comprising one or more instructions to limit the allocations that are provided to the user based on the quota of the user record.

22. The non-transitory memory device of claim 19, further comprising one or more instructions to limit a sum of the allocations that are provided to the user to an amount that is less than or equal to the quota.

23. The non-transitory memory device of claim 19, further comprising one or more instructions to set the quota of at least one user record of the plurality of user records to an entire amount of the balance.

24. The non-transitory memory device of claim 19, further comprising one or more instructions to base the quota on a percentage of the balance.

25. The non-transitory memory device of claim 19, further comprising one or more instructions to base the quota on a fixed amount of the balance.

26. The non-transitory memory device of claim 19, further comprising one or more instructions to provide a management interface to provide access to the account and the plurality of user records.

27. The non-transitory memory device of claim 19, further comprising one or more instructions to allow a management user to set the quota associated with each user record.

* * * * *